United States Patent
Ferraro et al.

(10) Patent No.: US 11,947,941 B2
(45) Date of Patent: Apr. 2, 2024

(54) DYNAMIC COMPUTATION OFFLOADING TO GRAPHICS PROCESSING UNIT

(71) Applicant: RED HAT, INC., Raleigh, NC (US)

(72) Inventors: Nicola Ferraro, Rome (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/410,032

(22) Filed: Aug. 24, 2021

(65) Prior Publication Data

US 2023/0061087 A1 Mar. 2, 2023

(51) Int. Cl.
*G06F 8/41* (2018.01)

(52) U.S. Cl.
CPC ............ *G06F 8/451* (2013.01); *G06F 8/4441* (2013.01); *G06F 8/457* (2013.01)

(58) Field of Classification Search
CPC ......... G06F 8/4441; G06F 8/451; G06F 8/457
See application file for complete search history.

(56) References Cited

U.S. PATENT DOCUMENTS

| | | | |
|---|---|---|---|
| 7,868,891 B2 | 1/2011 | Wexler et al. | |
| 8,669,990 B2 | 3/2014 | Sprangle et al. | |
| 8,830,245 B2 | 9/2014 | Bone et al. | |
| 9,342,366 B2 | 5/2016 | Lee et al. | |
| 2012/0317556 A1* | 12/2012 | Zhu | G06F 8/451 |
| | | | 717/146 |
| 2014/0052965 A1 | 2/2014 | Sarel | |
| 2015/0199787 A1* | 7/2015 | Pechanec | G06F 9/5044 |
| | | | 345/522 |
| 2016/0011857 A1* | 1/2016 | Grover | G06F 9/4552 |
| | | | 717/148 |
| 2017/0308364 A1* | 10/2017 | Munshi | G06F 8/456 |
| 2019/0171466 A1* | 6/2019 | Marathe | G06F 8/54 |

OTHER PUBLICATIONS

Fang, J. et al. (May 5, 2020). "Parallel Programming Models for Heterogeneous Many-Cores : A Survey," Institute for Computer Systems, College of Computer, National University of Defense Technology, pp. 30.

Sourouri, M. et al. (Oct. 5, 2016). "Panda: A Compiler Framework for Concurrent CPU+GPU Execution of 3D Stencil Computations on GPU-accelerated Supercomputers," International Journal of Parallel Programming, pp. 19.

* cited by examiner

*Primary Examiner* — Wei Y Zhen
*Assistant Examiner* — Amir Soltanzadeh
(74) *Attorney, Agent, or Firm* — Womble Bond Dickinson (US) LLP (57) ABSTRACT

A method includes receiving source code of a program to be compiled and compiling the source code of the program. Compiling the source code includes identifying a first function in the source code of the program that is a candidate to be executed by a graphics processing unit (GPU), generating a first intermediate representation and a second intermediate representation for the first function, and inserting a second function in the program in place of the first function, wherein the second function is to select one of the first intermediate representation or the second intermediate representation to be executed. The method further includes providing a compiled program package including the second function, the first intermediate representation and the second intermediate representation.

17 Claims, 6 Drawing Sheets

DYNAMIC COMPUTATION OFFLOADING TO GRAPHICS PROCESSING UNIT

TECHNICAL FIELD

Aspects of the present disclosure relate to compiling source code into executable formats for processing devices, and more particularly, compiling source code for dynamic computation offloading to a graphics processing unit (GPU).

BACKGROUND

A compiler interprets source code written in a high level computer programming language and converts the source code into a format that is executable by a processing device, such as a central processing unit (CPU). A compiler may convert the source code into a binary executable or other intermediate formats for execution by a processing device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Traditionally, central processing units (CPUs) were the primary or only processing device of computer systems to perform computations and operations. However, the graphics processing unit (GPU) is becoming used much more for general-purpose computations, especially in the context of parallel processing of vectorial data. For example, GPUs may be particularly useful for parallel processing for machine learning applications, digital signal processing, etc. To take advantage of GPUs available in a computing system, programmers generally use ad-hoc libraries that inject general purpose functions (e.g., computing kernels) into the GPU to be executed by the GPU on multiple data in parallel. Such libraries take the form of predefined kernel functions that are useful in a very specific context, such as signal transformation in audio libraries or vector/matrix operations in machine learning libraries. Such programming models can be highly useful for leveraging GPU capabilities. These conventional techniques, however, are very limited. In particular, the GPU-enabled libraries include code that is only useful in narrow niche technologies (e.g., machine learning) and developers have to write unique code in different languages to create GPU executable computing kernels and explicitly direct the compiler when to use the GPU executable computing kernels. Thus, developers without experience with GPU libraries may be unable to leverage GPU capabilities and GPU libraries may not extend to all areas in which utilizing a GPU may be useful.

Aspects of the disclosure address the above-noted and other deficiencies by providing dynamic computation offloading to GPU. In some examples, a compiler may receive source code of a program that is written in a single programming language. The compiler may then identify functions in the source code that may be useful for executing on a GPU, referred to herein as candidate functions. The identified candidate functions may be pure functions that are self-contained and that are applied on sequences of data (e.g., on points of a streaming source). A pure function may also be a function that does not change the input or produce side effects. The candidate functions can be filtered to remove any functions that cannot be translated to GPU code (e.g., functions that include recursion). The compiler may then compile the remaining candidate functions into both an intermediate GPU code representation and an intermediate CPU code representation. The compiler may further replace the original candidate functions in the source code with an interceptor function that, when called, selects which of the GPU code or CPU to execute. The interceptor function may then return the result of the selected code.

In one example, the interceptor function may call another function, algorithm, or model, herein referred to as an optimizer, to perform the selection of the GPU or CPU code to execute. During runtime of the program, the optimizer may collect information from several sources of the computer system on which the program executes. For example, the optimizer may collect hardware information about the computing devices (e.g., the CPUs or GPUs) available in the system, the memory layout of the system, a state of the computing devices, data about previous calls from the interceptor switch point, and flags in the source code provided by a user or programmer.

Advantages of the present disclosure include increased accessibility for programmers to leverage GPUs to make programs more efficient with better performance. Automatic compilation of functions into both CPU and GPU code and inserting interceptor switch points provides for extended usage of GPUs for general purpose computation in several classes of applications. Furthermore, the use of collected data to optimize the offloading and load balancing of certain functions from CPU to GPU may increase program efficiency and overall performance of a computing system, especially in hardware in which data is not required to be transferred from CPU memory to GPU memory (e.g., shared memory architecture). In particular, certain portions of a program that are better suited for being executed by a GPU can be automatically offloaded and the resources present on a computing system can be fully leveraged. Leveraging the GPU capabilities dynamically reduces the load on the CPUs of the system, increasing the number of applications that can be run by a single system (e.g., cloud server).

Figure 1:
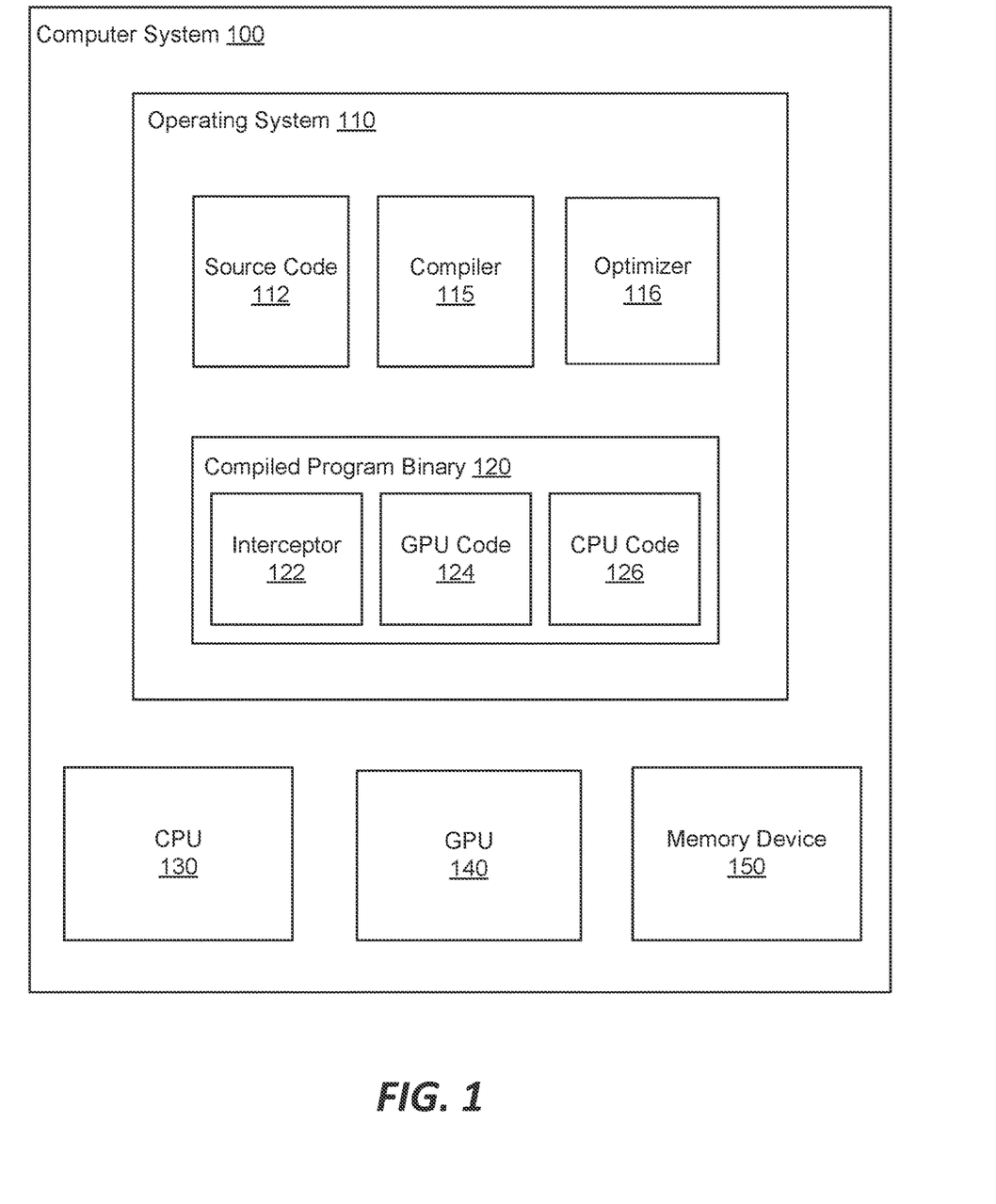
FIG. 1 is a system diagram that illustrates an example system for dynamic computation offloading to a graphics processing unit, in accordance with some embodiments.

FIG. 1 is a block diagram illustrating an example computer system 100 with dynamic computation offloading to GPU, according to some embodiments. Computer system 100 may be may be a server, a mainframe, a workstation, a personal computer (PC), a mobile phone, a palm-sized computing device, etc. Computer system 100 may include one or more processing devices including one or more central processing units (CPU) 130, graphics processing units (GPU) 140, and/or any other processing devices. In one example, the GPUs 140 may be configured for parallel processing of linear, or vectorial data. Computer system 100 may further include one or more memory devices 150. Memory 150 may include volatile memory devices (e.g., random access memory (RAM)), non-volatile memory devices (e.g., flash memory) and/or other types of memory devices. Memory 150 may include memory that is shared by the one or more CPUs 130 and one or more GPUs 140. In another example, memory 150 may include separate memory for the CPUs 130 and GPUs 140. Computer system 100 may execute (e.g., via CPU 130) an operating system 110. Operating system 110 manages the hardware resources of the computer system and provides functions such as inter-process communication, scheduling, memory management, and so forth.

In one example, operating system 110 may execute a compiler 115 for compiling source code 112 of a program, application, software, etc. The source code 112 may be any type of program or application. In one example, the source code 112 may be a program for general purpose computations. In another example, the source code 112 may be a program associated with processing streaming data or other sequences of data. The compiler 115 may compile the source code 112 into a compiled program binary 120 that is executable by one or more processing devices. During compilation of the source code 112, the compiler 115 may identify functions in the source code 112 that are candidates for offloading to a GPU at runtime. For example, the compiler 115 may identify functions that are self-contained, that are applied on points of a sequence of data such as a streaming source, and that do not change the input or produce other side effects/modifications of data. The compiler 115 may compile each such function into two different intermediate representations. For example, the compiler 115 may compile a candidate function into both CPU code 126 and GPU code 124, one of which may be selected to be executed at runtime. The compiler 115 may further replace the original function with an interceptor 122 which acts as a switch point to select which code to execute, the CPU code 126 or the GPU code 124. The CPU code 126 and the GPU code 124 may differ in terms of language constructs and high level operations available within them.

The operating system 110 may execute the compiled program binary 120. During execution of the compiled program binary 120, when execution reaches the interceptor 122 switch point the interceptor 122 may call optimizer 116 to determine whether to execute the GPU code 124 or the CPU code 126. The optimizer 116 may aggregate information about the computer system 100 including hardware information about the processing devices (e.g., CPU 130 and GPU 140), a memory layout of the computer system 100 (e.g., memory device 150, etc.), a state of the processing devices, previous executions of the interceptor 122 and any flags set by a user.

In one example, the optimizer 116 may be a machine learning model (e.g., statistical algorithm, neural network, or any other advanced machine learning algorithm). The model may be continuously updated based on the aggregated information about the computer system 100. Therefore, when the interceptor 122 calls the optimizer 116, the optimizer 116 may apply the model to a current state of the system to select the optimal code to execute. The optimal code to execute may be the code that provides the most efficient computation with respect to compute time and resources. For example, if the GPU(s) 140 are being utilized at a high rate while the CPU(s) 130 have a low utilization rate, the optimizer 116 may select the CPU code 126 to execute. In another example, if the GPU(s) 140 are available then the GPU code 124 may be selected for offloading the computation to the GPU(s) 140. The optimizer 116 may determine the optimal code based on the aggregated information of the computer system 100. The optimizer 116 may return the selection to the interceptor 122. The interceptor 122 may then load and invoke either the CPU 126 code to the CPU 130 if the CPU code 126 was selected or the GPU code 124 to the GPU 140 if the GPU code 124 was selected.

In one example, if the CPU code 126 is selected, the CPU 130 may take a buffer of data points received as input, iterate over them and call the CPU code 126 for the function on each of the data points. If the GPU code 124 is selected, the GPU(s) 140 may take the buffer of data points and execute the GPU code 124 of the function on the entire buffer at once. The buffer of data points may be transferred from memory of the CPU 130 and back if the computer system 100 does not include shared memory. In some examples, the optimizer 116 may eagerly or lazily install the GPU code 124 asynchronously on the GPU(s) 140 and execute the CPU code 126 until the GPU code 124 is available, at which point the optimizer 116 may select which code to be performed on any given buffer of data points. Thus, the optimizer 116 may load balance incoming data between the CPU(s) 130 and GPU(s) 140. In one example, the program defined by the source code 112 may be for a reactive data or streaming data application. Dynamic offloading to the GPU(s) 140 may be particular useful for reactive data or streaming applications because such applications may apply predefined transformations to streaming data which is the type of function that can be applied in parallel on a buffer of data.

Figure 2:
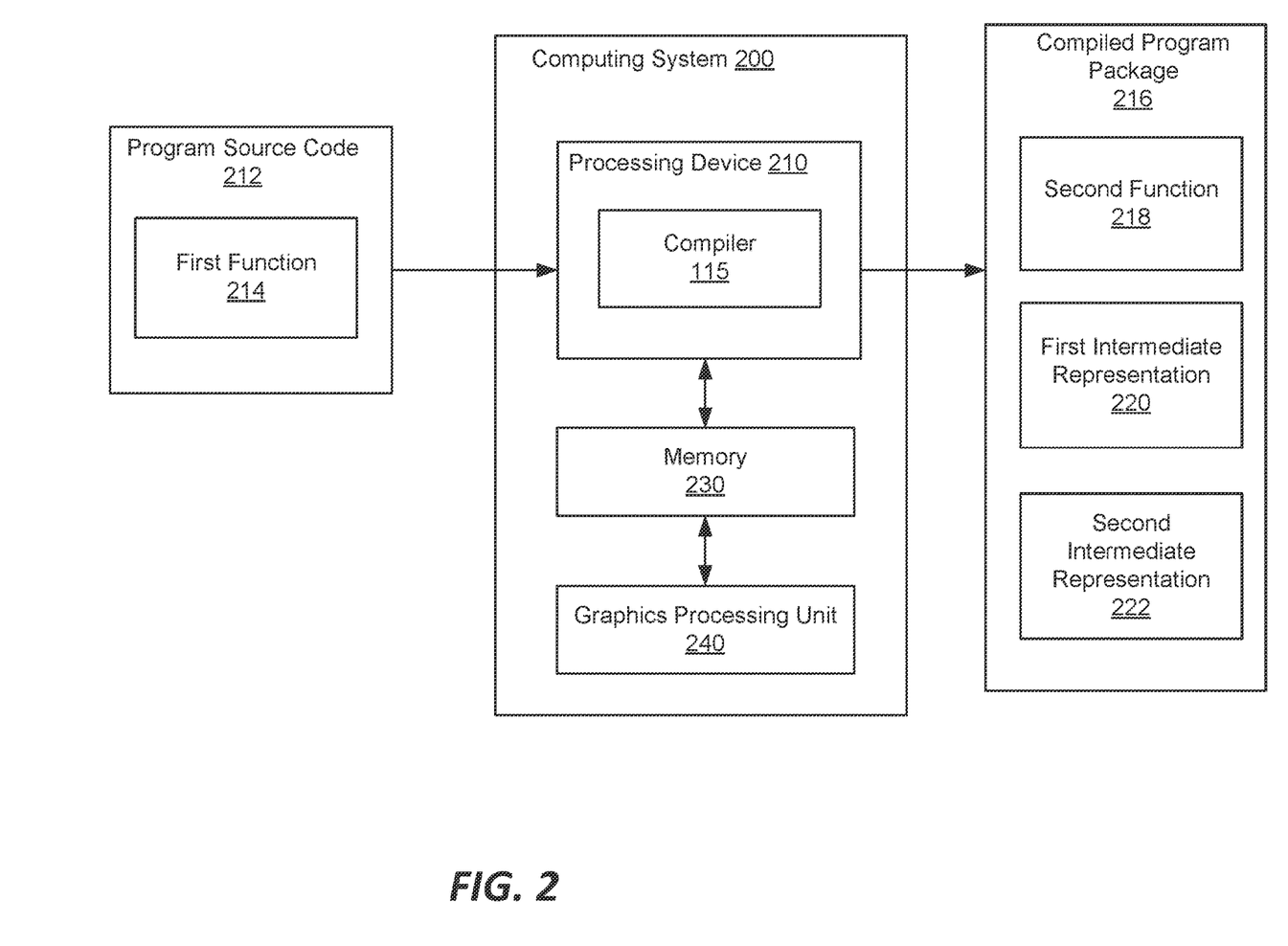
FIG. 2 is a block diagram that illustrates another example of a system for dynamic computation offloading to a graphics processing unit, in accordance with embodiments of the disclosure.

FIG. 2 is a block diagram that illustrates a computing system 200 for dynamic computation offloading to GPU, according to some embodiments. Computing system 200 may include a processing device 210, memory 230, and a graphics processing unit (GPU) 240. Memory 230 may include volatile memory devices (e.g., random access memory (RAM)), non-volatile memory devices (e.g., flash memory) and/or other types of memory devices. Processing device 210 may be a central processing unit (CPU) or other main processing device of computing system 200. GPU 240 may also be any peripheral device for data processing. GPU 240 may be coupled to the processing device 210 and to memory 230. For example, memory 230 may be shared memory between processing device 210 and graphics processing unit 240. In another example, GPU 240 may include or be associated with a separate memory from the processing device 210.

In one example, the processing device 210 may execute a compiler 115 for receiving and compiling program source code 212 into a compiled program package 216. For example, compiler 115 may receive program source code 212 and identify a first function 214 within the program source code 212 with attributes that make the first function 214 potentially useful to be executed by a GPU. For example, the compiler 115 may identify any functions (e.g., first function 214) in the program source code 212 that are pure functions that are self-contained and that are applied on sequences of data (e.g., on points of a streaming source). A pure function may also be a function that does not change the input or produce side effects on other data objects of the program. The compiler 115 may then compile the source code 212. The compiler 115 may compile the first function 214 into a first intermediate representation 220 for execution by a first type of processing device (e.g., a CPU) and a second intermediate representation 222 for execution by a second type of processing device (e.g., a GPU). The compiler 115 may also replace the first function 214 in the resulting compiled binary code with a second function 218 for determining which of the first intermediate representation 220 or the second intermediate representation 222 to execute. For example, the second function 218 may be a switch point, referred to herein as an interceptor, that can invoke either the first intermediate representation 220 or the second intermediate representation 222. In one embodiment, the second function 218 may call a model (e.g., machine learning model) to determine whether the first or second intermediate representation is the optimal code to execute. The optimal code may be the code that results in the most efficient execution (e.g., with respect to time or computing resources) of the function.

Figure 3:
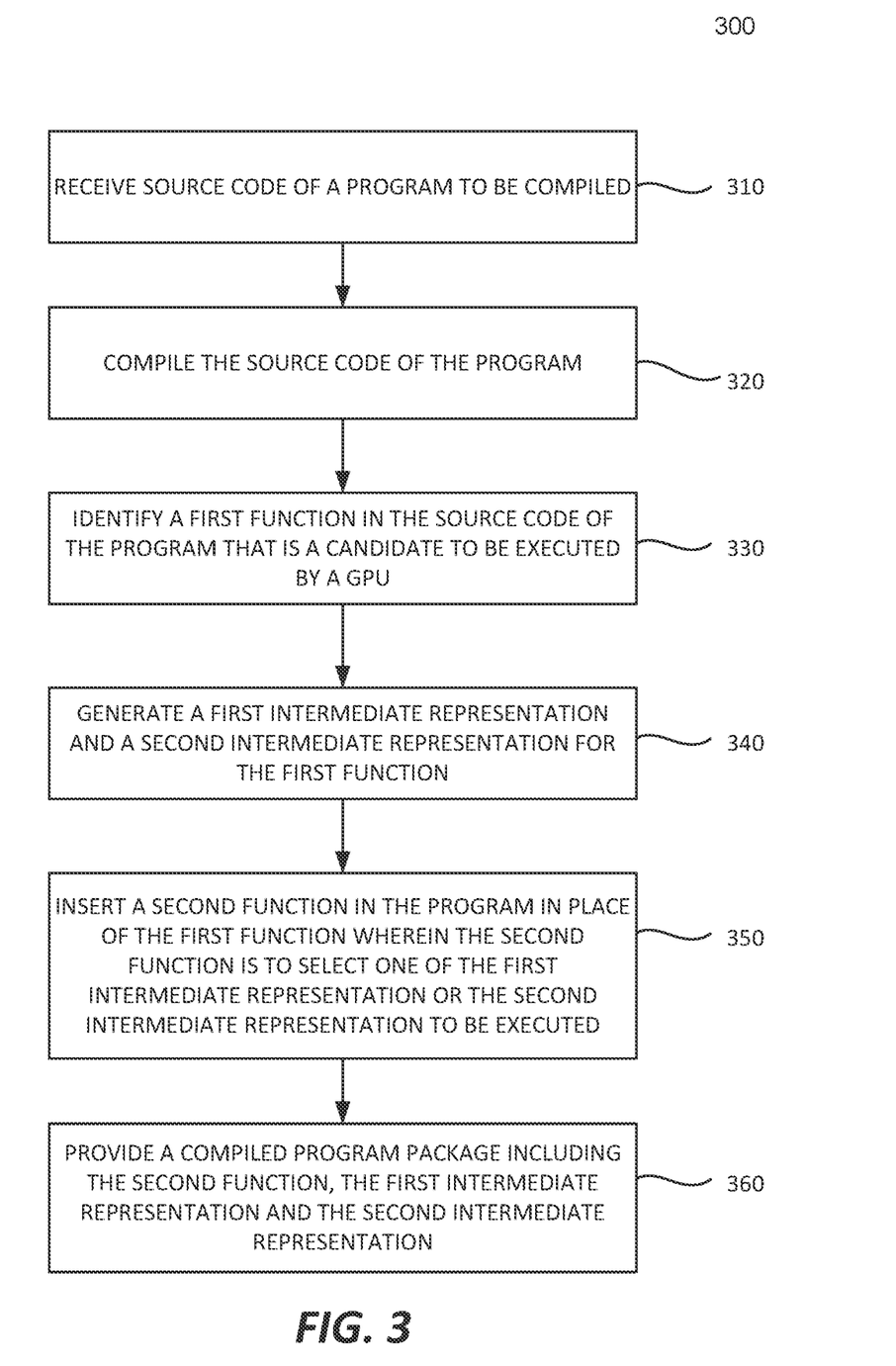
FIG. 3 is a flow diagram of a method of dynamic computation offloading to a graphics processing unit, in accordance with some embodiments.

FIG. 3 is a flow diagram of a method 300 of compiling source code for dynamic computation offloading, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by compiler 115 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives source code of a program to be compiled. The source code may be for any type of program that includes computations suitable for offloading to a GPU. The source code may include one or more functions. The source code may further include flags indicating particular functions that may be suitable for offloading to a GPU.

At block 320, the processing logic compiles the source code of the program according to the details of blocks 330, 340, and 350 below. At block 330, the processing logic identifies a first function in the source code of the program that is a candidate to be executed by a graphics processing unit (GPU). In one example, identifying the first function as a candidate to be executed by a GPU includes determining that the first function is a self-contained function and that the first function is applied on a sequence of data. For example, the first function may be a pure function that does not modify the inputs or result in any other mutations of data of the program. In one example, the processing logic may further identify the first function that is a candidate to be executed by a GPU by identifying a flag associated with the first function that indicates the function should be suitable for offloading to GPU. For example, a user or programmer may set flags in the source code to identify functions as preferred, or at least suitable, for executing on a GPU.

At block 340, the processing logic generates a first intermediate representation and a second intermediate representation for the first function. In one example, the first intermediate representation is the function compiled as a GPU kernel according to the rules of a GPU language or library to be executed by a GPU. The second intermediate representation may be the first function compiled according to the rules of the first programming language (e.g., the programming language of the source code) and to be executed by the CPU.

At block 350, the processing logic inserts a second function in the program in place of the first function, wherein the second function is to select one of the first intermediate representation of the second intermediate representation to be executed. In one example, the second function may be an interceptor as described herein. The second function, when executed, may call an optimizer function to select which of the first or second intermediate representation is to be executed. The optimizer may select the first or second intermediate representation in view of one or more metrics of the computer system. For example, the metrics may include hardware information about the computing devices (e.g., the CPUs or GPUs) available in the system, the memory layout of the system, a state of the computing devices, data about previous calls from the interceptor switch point, and flags in the source code provided by a user or programmer. At block 360, the processing logic provides a compiled program package including the second function, the first intermediate representation and the second intermediate representation. The compiled program package may then be executed as described in more detail below with respect to FIG. 5.

Figure 4:
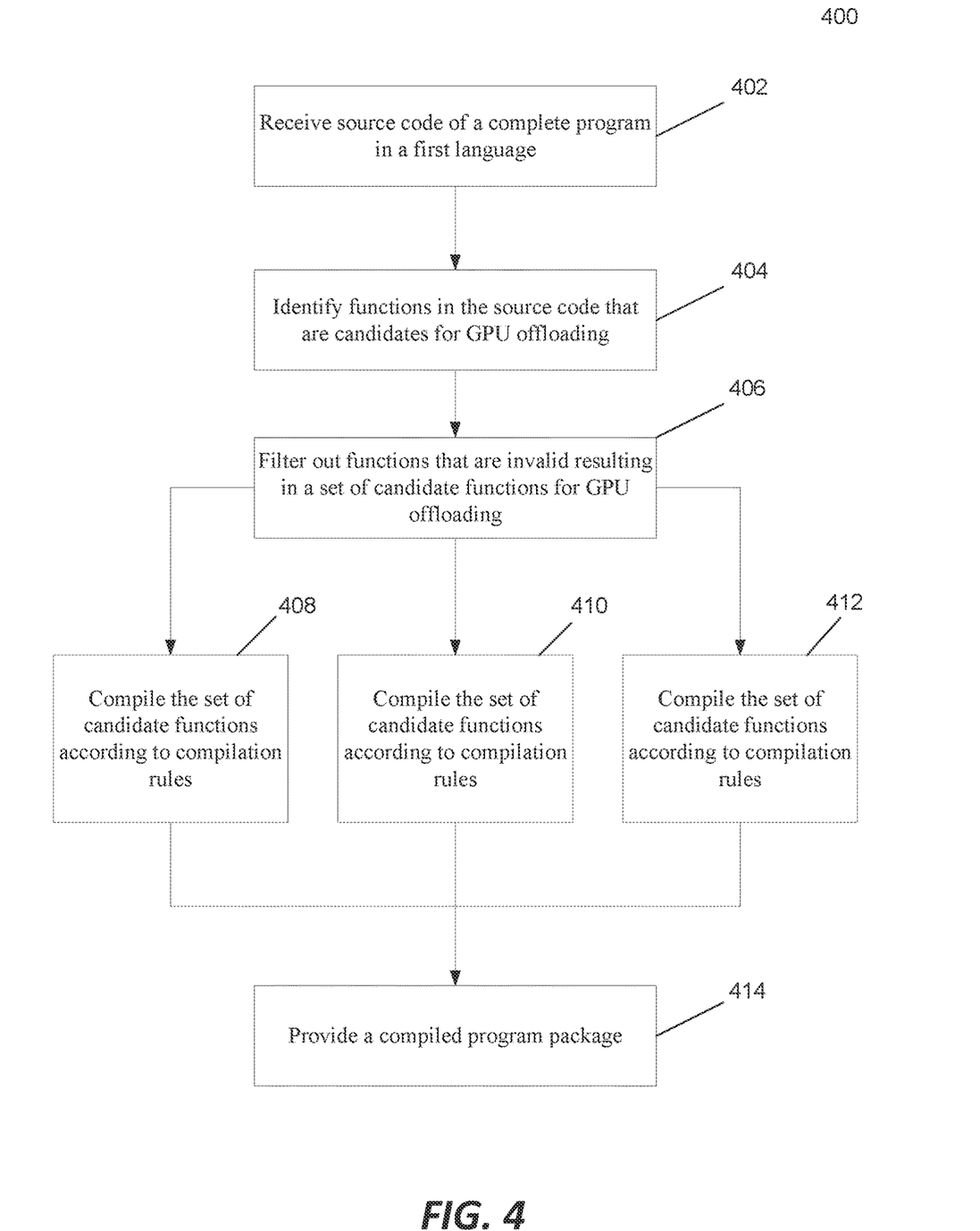
FIG. 4 is a flow diagram of another method of compiling source code for dynamic computation offloading to a graphics processing unit, in accordance with some embodiments.

FIG. 4 is a flow diagram of a method 400 of compiling source code for dynamic computation offloading to GPU, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a compiler 115 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 402, where the processing logic receives source code of a complete program written in a first computer programming language. The program may be any type of program or application (e.g., general purpose program, task specific program, domain specific program, etc.). The first computer programming language may be a high level programming language such as Java, C, C++, Python, or any other language that is to be compiled into an executable binary.

At block 404, the processing logic identifies functions in the source code that are candidates for offloading to a GPU. Candidate functions may be functions that have one or more particular properties. In one example, candidate functions may be functions that are pure functions that do not change or mutate the inputs to the function. The candidate functions may be self-contained functions. In one example, the candidate functions may be applied at a point of a sequence of data such as a data stream. In one example, the processing logic may identify the candidate functions via flags included in the source code identifying the functions associated with the flags as candidate functions. The flags may further include additional metadata that the compiler may pass to the optimizer in order to change and manage behavior of the program. For example, the flag may include a parameter to tell the optimizer to offload to GPUs only when the total load on the CPUs is greater than a threshold. The compiler may further accept configuration parameters to disable the automatic recognition of candidate functions and to only accept manual inputs such as flags or other markers for determining functions that are candidates to be offloaded to GPUs.

At block 406, the processing logic filters out functions from the candidate functions that are invalid. For example, the processing logic may determine whether the candidate functions include any properties that are incompatible with a GPU or that cannot be translated into intermediate GPU code. For example, a GPU intermediate representation may not support recursive functions. Thus, the processing logic may filter out candidate functions that include recursion.

At block 408, the processing logic compiles the set of candidate functions according to compilation rules of the first computer programming language. At block 410, the processing logic compiles the set of candidate functions according to compilation rules of a GPU programming language. Thus, the candidate functions are compiled into code to be executed by a CPU and code to be executed by a GPU. The compilation rules of the GPU programming language may generate a GPU kernel for each of the candidate functions that can be loaded to one or more GPUs and invoked on sequences of data in parallel (e.g., vectorial data, data stream, etc.).

At block 412, the processing logic compiles the source code replacing the original invocations of the candidate functions with an interceptor function. For example, at the location in the source code of the candidate functions, the processing logic may insert an interceptor function to act a switch point. For example, at runtime the interceptor determines whether to execute the GPU code compiled at block 408 or the CPU code compiled at block 408 for the function. Accordingly, the interceptor may select which code to execute at the point in the source code that the original candidate function would have executed. Thus, the function can be offloaded to a GPU when execution at that time would be more efficient with respect to execution time or resources utilized to perform the function.

At block 414, the processing logic packages the compiled source code, the GPU code and the CPU code. The processing logic may package the source code, GPU code for the compiled functions, and the CPU code for the compiled functions together such that the GPU code or CPU code may be loaded and invoked by the interceptor at the corresponding processing device.

Figure 5:
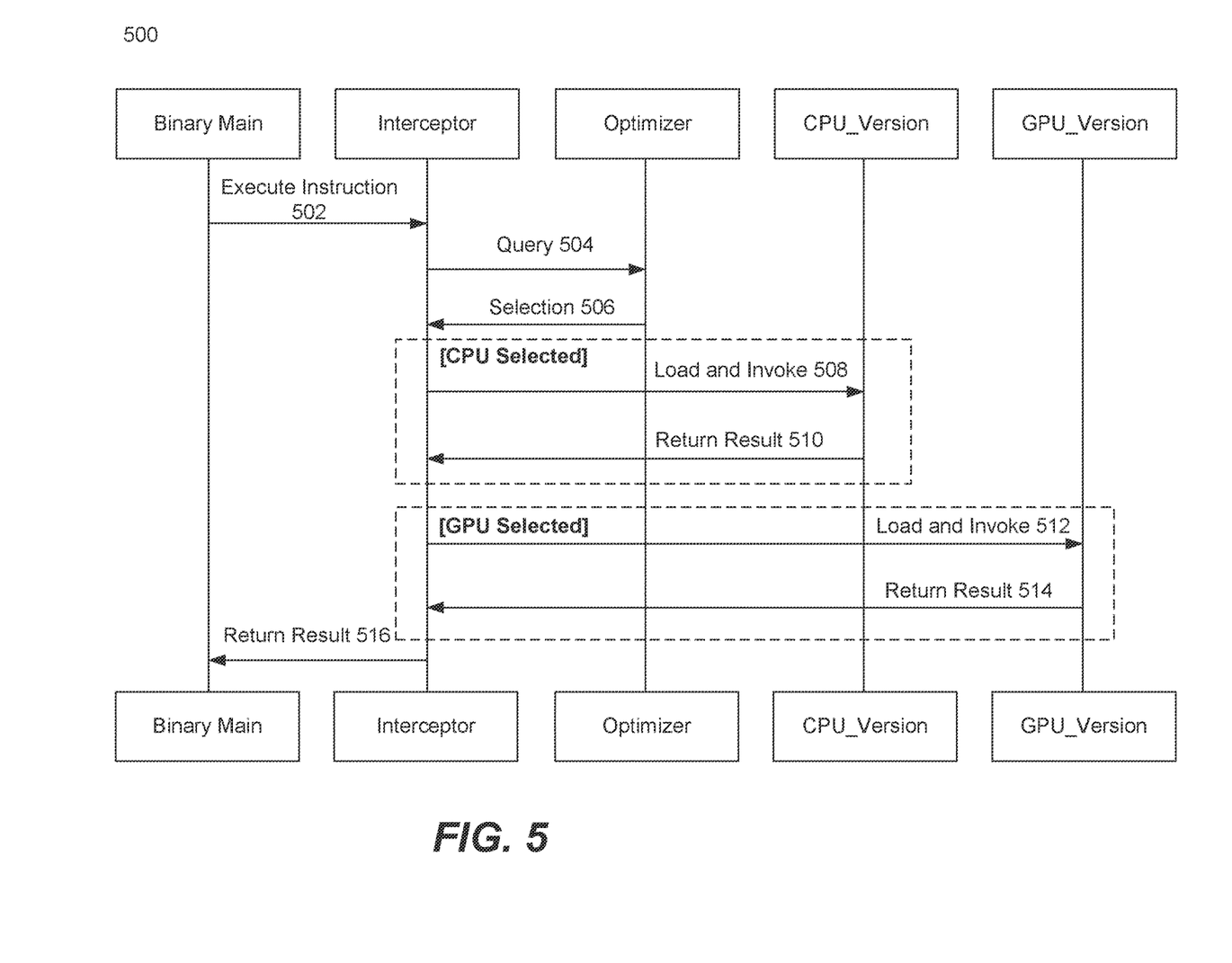
FIG. 5 is a flow diagram of runtime execution for dynamic computation offloading to a graphics processing unit, in accordance with some embodiments.

FIG. 5 depicts an example flow diagram of a process 500 for dynamic computation offloading to a GPU at runtime of a compiled program, according to some embodiments. At operation 502, the compiled binary main executes an interceptor instruction. As described above, the interceptor may replace the original function in the binary main. Accordingly, the interceptor instruction may be executed when execution of the binary main reaches the point in execution corresponding to invoking the original function.

At operation 504, the interceptor queries an optimizer for selecting CPU or GPU code. The interceptor may make the query to an optimizer. The optimizer may be an "oracle" type of function, model, or algorithm. The optimizer may collect several metrics for the computer system on which the binary main is executing. For example, the metrics may include hardware information about the computing devices (e.g., the CPUs or GPUs) available in the system, the memory layout of the system, a state of the computing devices, data about previous calls from the interceptor switch point, and flags in the source code provided by a user or programmer. The optimizer may train a machine learning model, or generate a general heuristic rules, based on the collected metrics to select the optimal path of execution (e.g., the CPU version or GPU version of the original function). At operation 506, the optimizer returns the resulting selection to the interceptor.

At operation 508, in response to selecting the CPU code, the interceptor loads and invokes the CPU version of the function to at the CPU. At operation 510, the CPU version of the function returns the result of the function to the interceptor. At operation 512, in response to selecting the GPU code, the interceptor loads and invokes the GPU version of the function at the GPU. At operation 514, the GPU version of the function returns the result of the function to the interceptor.

At operation 516, the interceptor returns the result to the binary main of the compiled program. Depending on the version of the function that was executed, the interceptor may return the result returned from the CPU version at operation 510 or the result returned from the GPU version at operation 512.

Figure 6:
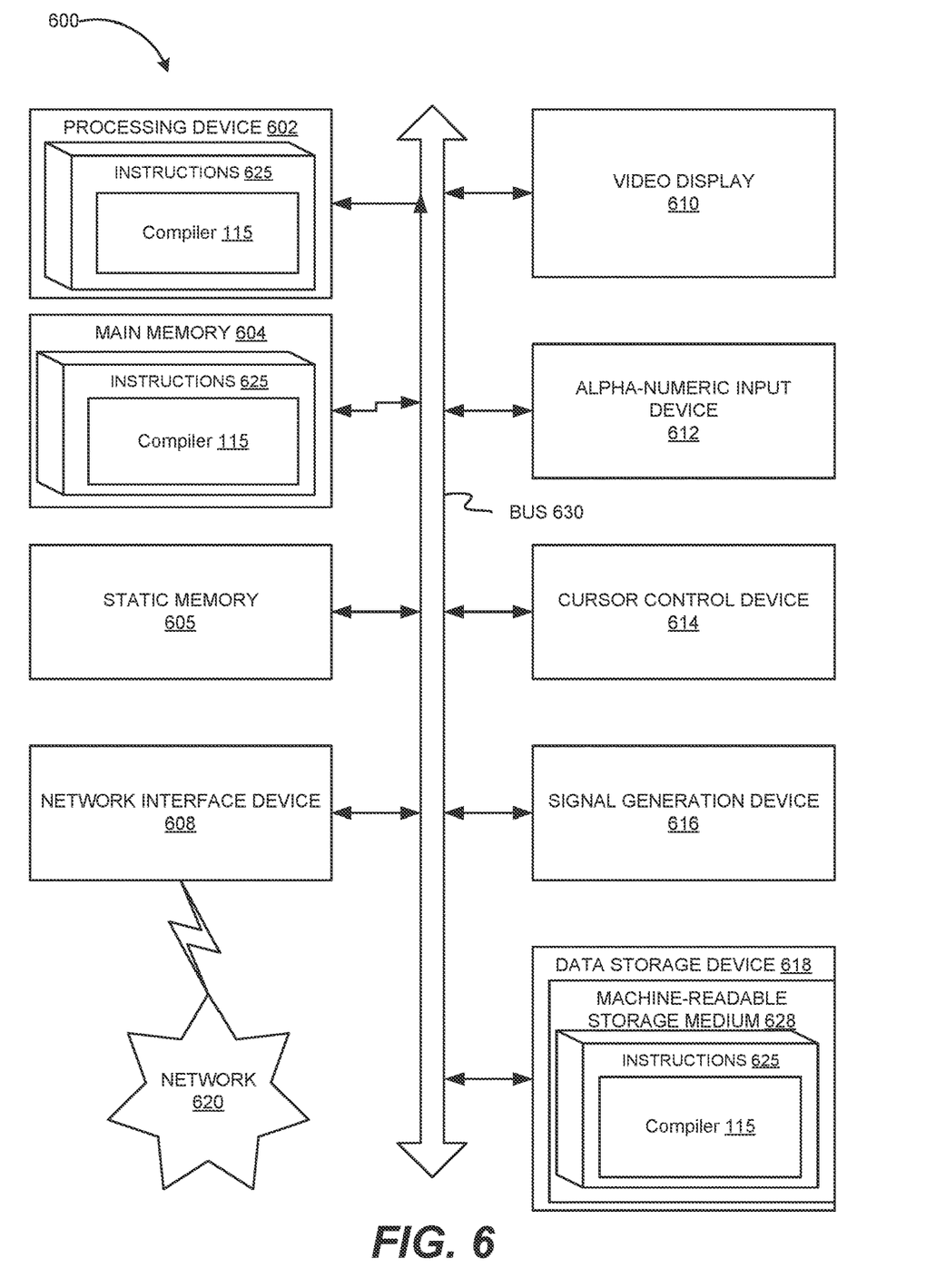
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a compiler, e.g., compiler 115, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving source code of a program to be compiled;
   compiling the source code of the program, wherein compiling the source code comprises: identifying, by a processing device, a first function in the source code of the program that is a candidate to be executed by a graphics processing unit (GPU);
   generating, by the processing device, a first intermediate representation and a second intermediate representation for the first function; and
   inserting, by the processing device, a second function in the program in place of the first function, wherein the second function comprises an interceptor function to invoke an optimizer function, the optimizer function to select between the first intermediate representation or the second intermediate representation to be executed at runtime in view of available computing resources and a state of one or more computing devices available to execute the first or second intermediate representations, and wherein the interceptor function returns a result of the selected first intermediate representation or the second intermediate representation in place of the first function; and
   providing a compiled program package comprising the second function, the first intermediate representation and the second intermediate representation.

2. The method of claim 1, wherein the optimizer function selects the first intermediate representation or the second intermediate representation in view of one or more metrics.

3. The method of claim 1, wherein the first intermediate representation comprises an intermediate GPU kernel to be executed by the GPU and the second intermediate representation comprises an intermediate central processing unit (CPU) code to be executed by a CPU.

4. The method of claim 1, wherein identifying the first function in the source code as a candidate to be executed by the GPU comprises:
   determining that the first function is a self-contained function; and
   determining that the first function is applied on a sequence of data.

5. The method of claim 1, wherein identifying the first function in the source code as a candidate to be executed by the GPU comprises:
   determining that the first function is associated with a flag indicating that the first function is to be executed by the GPU.

6. The method of claim 1, wherein the first intermediate representation is compiled according to a first language and the second intermediate representation is compiled according to a second language.

7. A system comprising:
   a memory; and
   a processing device operatively coupled to the memory, the processing device to:
      receive source code of a program to be compiled;
      compile the source code of the program, wherein to compile the source code the processing device is to:
         identify a first function in the source code of the program that is a candidate to be executed by a graphics processing unit (GPU);
         generate a first intermediate representation and a second intermediate representation for the first function; and
         insert a second function in the program in place of the first function, wherein the second function comprises an interceptor function to invoke an optimizer function, the optimizer function to select between the first intermediate representation or the second intermediate representation to be executed at runtime in view of available computing resources and a state of one or more computing devices available to execute the first or second intermediate representations, and wherein the interceptor function returns a result of the selected first intermediate representation or the second intermediate representation in place of the first function; and
      provide a compiled program package comprising the second function, the first intermediate representation and the second intermediate representation.

8. The system of claim 7, wherein the optimizer function selects the first intermediate representation or the second intermediate representation in view of one or more metrics.

9. The system of claim 7, wherein the first intermediate representation comprises an intermediate GPU kernel to be executed by the GPU and the second intermediate representation comprises an intermediate central processing unit (CPU) code to be executed by a CPU.

10. The system of claim 7, wherein to identify the first function in the source code as a candidate to be executed by the GPU, the processing device is to:
    determine that the first function is a self-contained function; and
    determine that the first function is applied on a sequence of data.

11. The system of claim 7, wherein to identify the first function in the source code as a candidate to be executed by the GPU, the processing device is to:
    determine that the first function is associated with a flag indicating that the first function is to be executed by the GPU.

12. The system of claim 7, wherein the first intermediate representation is compiled according to a first language and the second intermediate representation is compiled according to a second language.

13. A non-transitory computer-readable storage medium including instructions that, when executed by a processing device, cause the processing device to:
    receive source code of a program to be compiled;
    compile the source code of the program, wherein to compile the source code the processing device is to:

identify, by the processing device, a first function in the source code of the program that is a candidate to be executed by a graphics processing unit (GPU);

generate, by the processing device, a first intermediate representation and a second intermediate representation for the first function; and insert, by the processing device, a second function in the program in place of the first function, wherein the second function comprises an interceptor function to invoke an optimizer function, the optimizer function to select between the first intermediate representation or the second intermediate representation to be executed at runtime in view of available computing resources and a state of one or more computing devices available to execute the first or second intermediate representations, and wherein the interceptor function returns a result of the selected first intermediate representation or the second intermediate representation in place of the first function; and provide a compiled program package comprising the second function, the first intermediate representation and the second intermediate representation.

14. The non-transitory computer-readable storage medium of claim 13, wherein the optimizer function selects the first intermediate representation or the second intermediate representation in view of one or more metrics.

15. The non-transitory computer-readable storage medium of claim 13, wherein the first intermediate representation comprises an intermediate GPU kernel to be executed by the GPU and the second intermediate representation comprises an intermediate central processing unit (CPU) code to be executed by a CPU.

16. The non-transitory computer-readable storage medium of claim 13, wherein to identify the first function in the source code as a candidate to be executed by the GPU, the processing device is to:

determine that the first function is a self-contained function; and determine that the first function is applied on a sequence of data.

17. The non-transitory computer-readable storage medium of claim 13, wherein to identify the first function in the source code as a candidate to be executed by the GPU, the processing device is to:

determine that the first function is associated with a flag indicating that the first function is to be executed by the GPU.

* * * * *